Patented Apr. 15, 1930

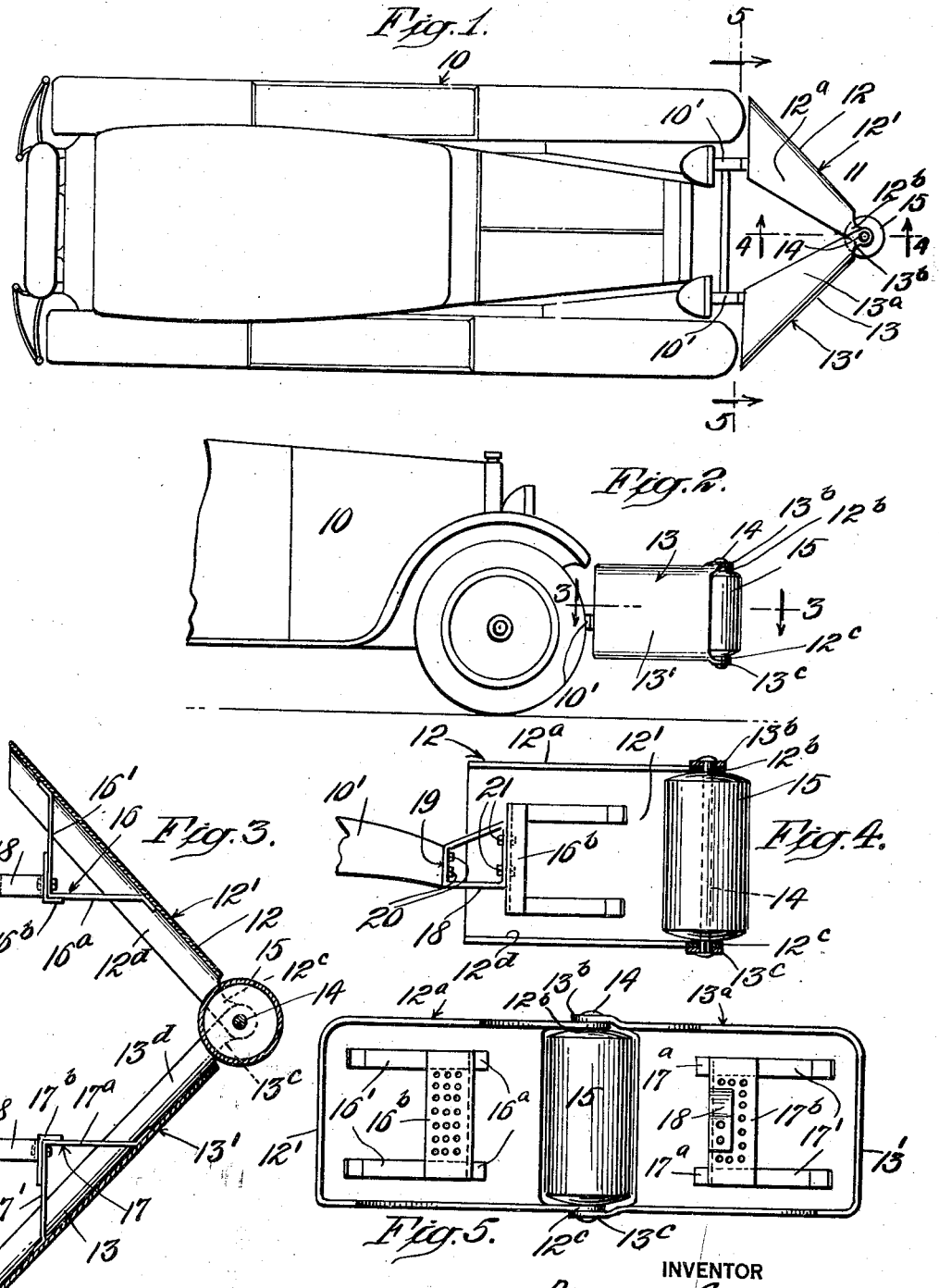

1,754,934

UNITED STATES PATENT OFFICE

DOMENICO CAPOBIANCO, OF NEW YORK, N. Y.

AUTOMOBILE BUMPER

Application filed October 26, 1929. Serial No. 402,562.

This invention relates to improvements in automobile bumpers.

The object of this invention is to provide for automobiles a bumper which will be composed of two main bumper elements or parts readily adjustable pivotally about a centrally-located pivot so as to fit automobiles of varying widths and which is also adjustable vertically in relation to the chassis of the car to which it is attached.

Still another object of my invention is to provide a bumper of the horizontally-adjustable type hereinabove specified in which the two pivoted parts will extend outwardly in inclined or angular relationship and be connected together at the median line of the car so as to provide side deflecting elements for deflecting to the side of the automobile any object which may collide with the bumper.

Still another object of my invention is to provide at the apex of the angle at which said two elements are connected a roller mounted upon a vertically-disposed pivot and adapted to direct an object which is struck by the bumper at the central portion to either side thereof and into contact with the inclined side deflecting shield members.

Still another object of my invention is to provide a bumper in which a single pin will serve the double function of a pivot for the inclined deflecting members and as a shaft for the roller.

With these and other objects in view, the invention comprises the combination of members and arrangement of parts so combined as to co-act and cooperate with each other in the performance of the functions and the accomplishment of the results herein contemplated, and comprises in one of its adaptations the species or preferred form illustrated in the accompanying drawings, in which:—

Fig. 1 is a plan view of an automobile having attached thereto a bumper embodying my invention;

Fig. 2 is a fragmentary side elevation of the front end of an automobile showing my bumper attached;

Fig. 3 is a horizontal section on the line 3—3 of Fig. 2;

Fig. 4 is a section on the line 4—4 of Fig. 1; and

Fig. 5 is a section on the line 5—5 of Fig. 1.

Referring now to these drawings, which illustrate a preferred embodiment of my invention, 10 indicates an automobile having the usual chassis horns 10' on which my bumper 11 is mounted.

In the preferred embodiment of my invention illustrated, my improved bumper comprises deflecting shield members 12 and 13, preferably formed of sheet metal, and, as shown, are disposed in inclined relationship to each other and extend from the opposite sides of the chassis to a vertically-disposed centrally-located pivot 14 and together form a bumper of angular or substantially V-shape in conformation. In the said preferred embodiment of my invention illustrated, said pivot 14 also has an additional function and serves as a mounting shaft for a roller 15 which thus rotates about a vertical shaft and is adapted to have a rolling movement to either side. In the said preferred embodiment of my invention illustrated, the deflecting members 12 and 13 are cut away contiguous to the pivot 14 so as to provide a housing for a portion of the roller 15 and the parts are so arranged that when an object strikes the roller 15 it will cause a rolling action of the roller to one side or the other so as to move the object to that side of the bumper, whereupon such object will contact with the deflecting sides and will be further deflected to one side or the other of the automobile and its wheels.

In the said preferred form of my invention illustrated, the deflecting members 12 and 13 are provided with vertical shield or web portions 12', 13' which are bent over, as shown, to provide substantially horizontal flange portions 12$^a$ and 13$^a$ respectively and lower horizontally-disposed flange portions 12$^d$ and 13$^d$ which flange portions are preferably formed in one piece with the members 12 and 13 and bent inwardly therefrom. The horizontal flange portions 12$^a$ and 13$^a$ have at their outer ends portions 12$^b$ and 13$^b$ engaging to form an upper pivot bearing for the pivot member 14, and lower bearing portions 12ᶜ, 13ᶜ are similarly formed on the lower flange portions 12ᵈ, 13ᵈ.

In the said preferred embodiment of my invention shown, the said deflecting shield members 12 and 13 are provided on their interior surfaces with mounting frame members to enable attachment of the said deflecting shield elements to the car chassis and these mounting frame members also serve as a reinforcement for the sheet metal deflecting members. As illustrated in said preferred embodiment of my invention, mounting frame members 16 and 17 comprising angle bars welded or otherwise securely fastened to the inner surface of the shield elements are provided and each of these mounting frames is composed of transverse members 16′ and 17′ and forwardly-projecting members 16ᵃ, 17ᵃ which are connected together by vertically-disposed angle irons 16ᵇ, 17ᵇ which vertically-disposed angle irons or plates are utilized as adjustment plates to enable a single bumper to be attached to automobiles of varying widths and also to enable a vertical adjustment of the bumper in relation to the chassis to be accomplished. In the preferred embodiment of my invention, I employ for the adjustable mounting of the bumper on the chassis a vertically-disposed mounting bracket 18 of polygonal configuration which at one side abuts against the face of the chassis horn as indicated at 19 of the car chassis and is fastened thereto by bolts 20 and at its opposite side is fastened to the vertically-disposed adjustment plates 16ᵇ, 17ᵇ by bolts 21.

Having described my invention, I claim:—

1. An automobile bumper composed of two main bumper elements pivoted together at a centrally-located point to provide a bumper relatively V-shaped in conformation, said elements extending at their opposite ends to a position adjacent to the sides of the car chassis, and mounting means capable of horizontal adjustment for mounting said bumper on the car chassis.

2. An automobile bumper composed of two main bumper elements, each comprising a vertical web portion and integral horizontal flange portions, said flange portions being pivoted together at the outer ends of the bumper elements to provide a bumper relatively V-shaped in conformation, said elements extending at their opposite ends to a position adjacent to the sides of the car chassis, and means adjustable horizontally for mounting said bumper on the car chassis.

3. An automobile bumper composed of two main bumper elements formed of sheet metal and bent to provide vertical web portions and horizontal flange portions, said flange portions being pivoted together on a vertical pivot pin at the forward ends of the said bumper elements to provide a bumper relatively V-shaped in conformation and extending at their opposite ends to a position adjacent to the sides of the car chassis, mounting means capable of horizontal adjustment for mounting said bumper on the car chassis, and a roller mounted on the said pivot pin at the outer end of said deflecting members.

4. An automobile bumper composed of two main bumper elements, each composed of a single sheet of sheet metal bent to provide an intermediate vertical web portion and integral horizontally-disposed upper and lower flange portions provided at the forward ends of said elements with pivot bearings, a vertically-disposed pivot pin mounted in said bearings to connect the same together, mounting frames arranged adjacent to the opposite ends of said deflecting shield elements, and means on said mounting frames for adjustably mounting said bumper on the car chassis.

In witness whereof, I have signed my name to the foregoing specification.

DOMENICO CAPOBIANCO.